April 21, 1925.
C. R. SHORT ET AL
1,534,742
CARBURETOR CONTROL
Filed May 22, 1923  2 Sheets-Sheet 2
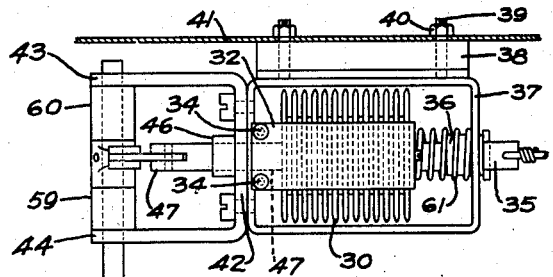
Fig. 2
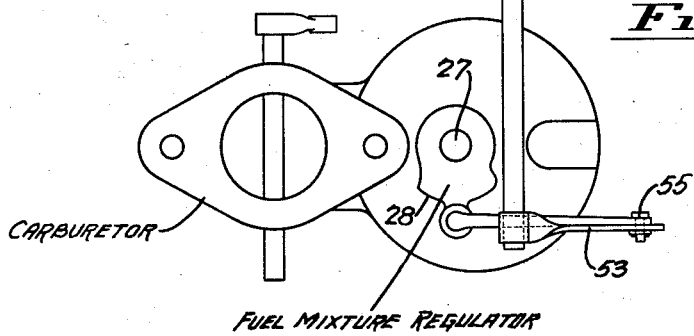

Patented Apr. 21, 1925.

1,534,742

UNITED STATES PATENT OFFICE.

CHARLES R. SHORT AND ABRAHAM M. BABITCH, OF DAYTON, OHIO, ASSIGNOR TO GENERAL MOTORS RESEARCH CORPORATION, OF DAYTON, OHIO, A CORPORATION OF DELAWARE.

CARBURETOR CONTROL.

Application filed May 22, 1923. Serial No. 640,794.

*To all whom it may concern:*

Be it known that we, CHARLES R. SHORT, a subject of the King of Great Britain, and ABRAHAM M. BABITCH, a citizen of the United States of America, residing at Dayton, county of Montgomery, and State of Ohio, have invented certain new and useful Improvements in Carburetor Controls, of which the following is a full, clear, and exact description.

This invention relates to internal combustion engines and has among its objects to regulate the richness of the engine fuel in accordance with engine temperature and to control the fuel mixture automatically by the operation of the engine starting device.

Other and further objects and advantages of the present invention will be apparent from the following description, reference being had to the accompanying drawing wherein a preferred embodiment of the present invention is clearly shown.

In the drawings:

Fig. 2 is a plan view on an enlarged scale of certain apparatus shown in Fig. 1.

Figure 1:
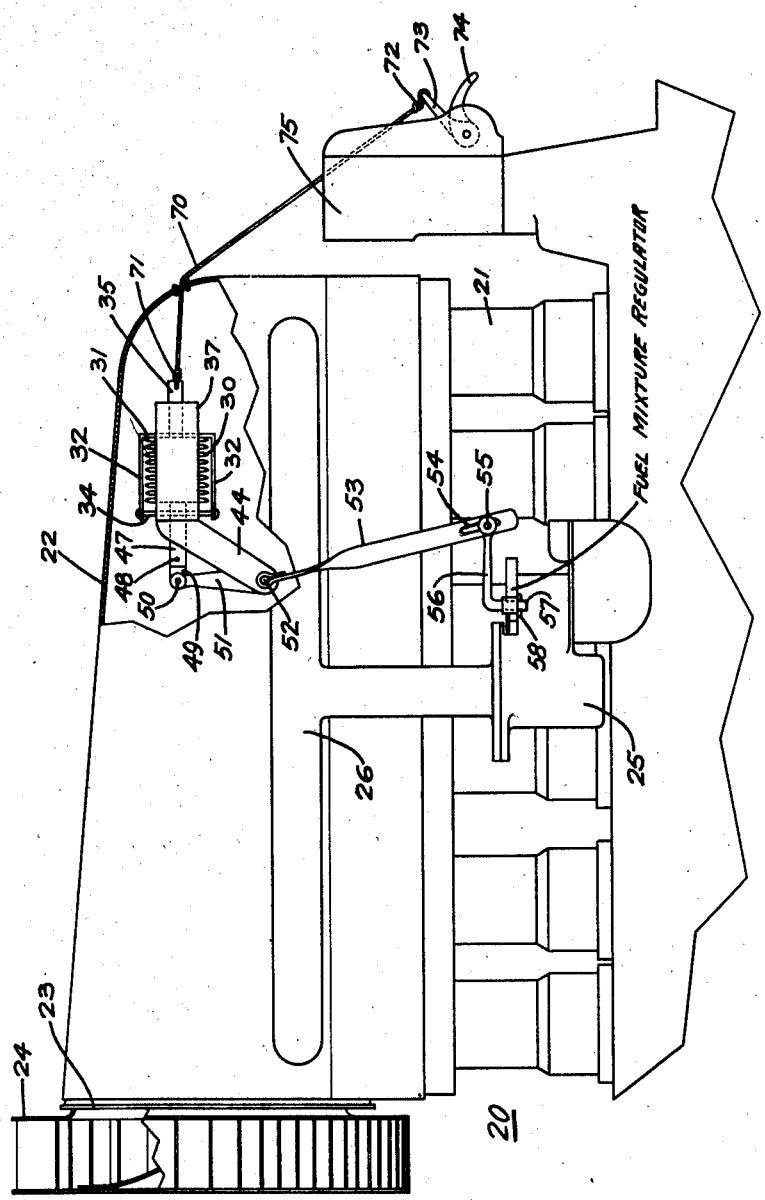
Fig. 1 is a side elevation of an internal combustion engine partly broken away in order to show the present invention.

In the drawings 20 designates as a whole an internal combustion engine having a plurality of cylinders 21 adapted to be cooled by passing air along them through a draft tube 22, having an outlet 23 leading into a fan 24 supported by and driven by the engine 20 in any suitable manner, not shown. An engine carburetor 25 is connected with the intake manifold 26 and includes mechanism for controlling the proportions of air and atomized fuel entering the intake. This mechanism is shown in detail in the copending application of Fred E. Aseltine, Serial No. 471,609, filed May 23, 1921. For the understanding of the present invention it is sufficient to state that this invention includes an operating shaft 27 to which is attached the lever 28. Turning the lever 28 in one direction will cause the mixture to be rich or in the other direction will cause the mixture to be lean.

The apparatus which is responsive to engine temperature for controlling the lever 28 comprises a thermostat 30 or flexible metal bellows containing a relatively volatile fluid, such as ether, and mounted above the engine cylinders in the air stream moving from the cylinders toward the air circulating fan 24. The bellows 30 is attached at one end to the yoke portion 31 of a U-shaped frame having branches 32 and 33 connected by rods 34. The yoke portion 31 is attached to a rod 35 passing through a bushing 36 carried by a frame 37 which is attached to a bracket 38 secured by studs 39 and nuts 40 to the side 41 of the draft tube 22. The yoke 42 of a bracket having branches 43 and 44 is secured by means of nuts 45 to the other end of the bracket 37. The yoke 42 carries a bushing 46 through which slides a rod 47 attached to the free end of the metal bellows 30. The rod 47 is connected by pin 48 with link 49 which is connected by pin 50 with an arm 51 attached to the rod 52 rotatably mounted upon the branches 43 and 44. The shaft 52 is connected with an arm 53 provided with a slot 54 for receiving a pin 55 carried by a link 56. Link 56 is provided with an end portion 57 received by the free end of lever 28 and held in place by a pin 58. Endwise movement of shaft 52 is prevented by spacers 59 and 60.

A spring 61 is interposed between the frame 37 and the frame 31 and tends normally to hold the rod 34 against the frame 37.

As the engine temperature increases the temperature of the air circulating through the draft tube will increase, thereby causing the metal bellows 30 to expand and the shaft 52 to be rotated counterclockwise. This movement will be transmitted to the lever 28 causing it to be moved counterclockwise to decrease the richness of the fuel mixture.

Conversely, when the engine cools, the bellows 30 will contract and cause the lever 28 to be moved clockwise to increase the richness of the mixture. In this manner the engine fuel mixture can be regulated in accordance with the engine temperature. The fuel mixture will be relatively rich while the engine is cold in order to facilitate starting the engine, and, as the engine temperature increases the fuel mixture will gradually decrease to a proportion which is economical for engine running when the engine is well warmed up.

The control of the fuel mixture in accordance with engine temperature however is modified automatically when the starting device is rendered operative for starting the engine, in order that the fuel mixture can be rendered temporarily rich only during the process of starting the engine. This mechanism includes a flexible cable 70 attached at 71 to the rod 35, and, at 72, to an arm 73 connected with the starter pedal 74 for operating an engine starter 75. The particular form of starter represented diagrammatically in the drawings is claimed and described in the copending application of William A. Chryst Serial No. 630,637, filed April 7, 1923. For the understanding of the present invention it is sufficient to state when the pedal 74 is depressed, the starting device 75 which includes an electric motor will be rendered operative and will be connected with the engine through suitable gearing. When the pedal 74 is released it will be returned automatically by a spring to non-operating position.

It is apparent that whenever the pedal 74 is depressed, the bellows 30 will be moved bodily to the right as viewed in the drawings, regardless of its state of expansion or contraction, and that this movement will cause the lever 28 of the carburetor to be moved clockwise to increase the richness of the mixture. The status of the bellows 30 as determined by engine temperature is not changed by this temporarily displacement of the bellows during the starting operation. Therefore, after starting has been completed, the bellows 30 will be returned by the spring 61 to normal position and the setting of the carburetor will remain as predetermined by engine temperature.

In other words, engine temperature primarily controls the fuel mixture, but the control by the thermostat is temporarily modified during the operation of the engine starter and then is restored after the starting operation is discontinued.

While the form of embodiment of the invention as described constitutes a preferred form, it is to be understood that other forms might be adopted, all coming within the scope of the claims which follow.

What we claim is as follows:

1. Apparatus for controlling engine fuel comprising the combination with a fuel mixture regulator; of engine temperature responsive means including a thermostat and linkage between the thermostat and the regulator for operating the regulator; and means controlled automatically by the starting of the engine for moving said thermostat bodily in order to modify the action of the temperature responsive means.

2. Apparatus for controlling engine fuel comprising the combination with a fuel mixture regulator; of engine temperature responsive means including a flexible metal bellows and devices for connecting the bellows with the regulator for operating the regulator; and means controlled automatically by the starting of the engine for moving the bellows bodily in order to modify the action of the temperature responsive means.

In testimony whereof we hereto affix our signatures.

CHARLES R. SHORT.
ABRAHAM M. BABITCH.

Witnesses:
GEO. E. PASCO,
WM. P. PASCO.